United States Patent [19]

Chalmers et al.

[11] Patent Number: 4,524,397
[45] Date of Patent: Jun. 18, 1985

[54] HEAD POSITIONING SYSTEM FOR A DISC DATA STORE

[76] Inventors: Brian D. Chalmers, 1 Morar Pl., Kinross, Tayside; David S. Ruxton, 2 Banks Crescent, Crieff, both of Scotland; Kenneth L. Miller, 24108 E. River Rd., Grosse Ile, Mich. 48132

[21] Appl. No.: 467,126

[22] Filed: Jan. 27, 1983

[30] Foreign Application Priority Data

Sep. 19, 1980 [GB] United Kingdom ............... 8030338

[51] Int. Cl.³ .......................................... G11B 21/10
[52] U.S. Cl. .................................... 360/77; 318/561
[58] Field of Search ................. 360/77, 78; 318/561

[56] References Cited

U.S. PATENT DOCUMENTS 3,691,543 9/1972 Mueller .............................. 360/77

FOREIGN PATENT DOCUMENTS 1402747 8/1975 United Kingdom .
1439551 6/1976 United Kingdom .

Primary Examiner—George G. Stellar
Attorney, Agent, or Firm—Mark T. Starr; Edmund M. Chung; Kevin R. Peterson

[57] ABSTRACT

In a disc data store, wherein a read/write head is radially positionable by a feedback servomechanism to interact with a selectable one out of a plurality of radially equispaced data storage tracks on a rotary disc, the positioning errors resultant from phase errors between the plural signals available as the output of an optical grating head position transducer are eliminated by replacing one of the data storage tracks with a servo track by arranging that the period of the recursive, triangular wave position indicating signals from the transducer is equal to twice the radial spacing between tracks on the disc, by selecting as the exclusively-used position indicating signal that one of the plurality of transducer signals which brings the head to the center of the servo track with least offset, and, while employing that selected signal or its generated inverse as the feedback signal to the servomechanism applying that least offset as a correction when positioning the head over data storage tracks.

9 Claims, 9 Drawing Figures

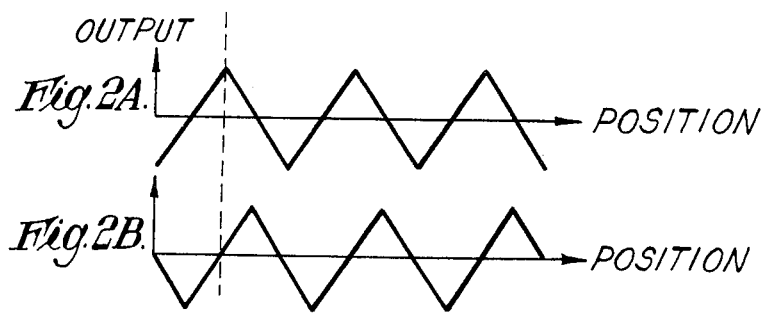
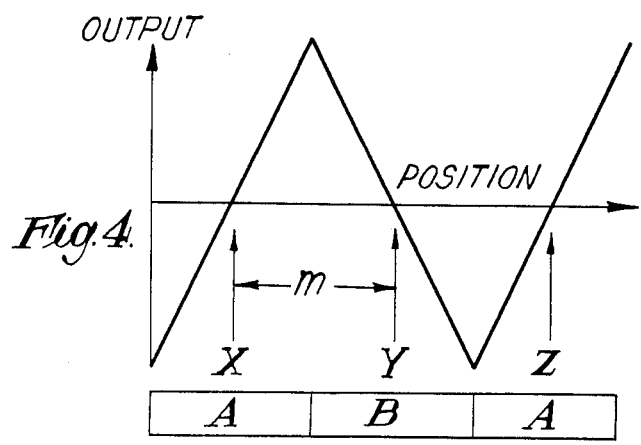
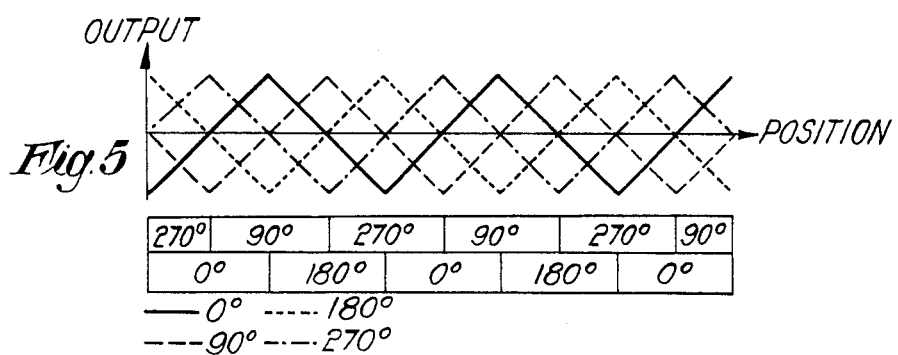

4,524,397

HEAD POSITIONING SYSTEM FOR A DISC DATA STORE

BACKGROUND TO THE INVENTION

1. Field of the Invention

The present invention relates to a method and apparatus for selectably positioning a head over data storage tracks on a rotatable disc in a disc data store.

2. The Prior Art

It is well known to employ a feedback servomechanism to position a magnetic read/write head over selectable, concentric circular radially equispaced data storage tracks on a magnetic rotatable disc in a disc data store. It is also well known to employ as the positional feedback device in such a servomechanism, a plural phase transducer providing as position indicating output a plurality of cyclically distance repetitive signals. Magnetic and optical grating devices are in common use, providing triangular or sinusoidal outputs.

Mechanical tolerances, thermal dimensional changes, and transducer inaccuracies are reflected in a misplacing of the head over the track. Servo tracks may be recorded among the data tracks for purposes of referencing all positions to the disc. As the amount of data on each disc increases, and the tracks become closer together, this measure alone is insufficient for the accurate placing of the head over a track. The common usage of plural phase position transducers has, inherently therein, an error resulting from inaccuracies in the relative phase between signals. This error becomes significant at high track densities.

SUMMARY OF THE INVENTION

The present invention consists in a feedback servomechanism, for selectively positioning a head adjacently to one or more out of a plurality of concentric circular tracks on a rotatable disc in a disc data store comprising a head position transducer for providing responsively to a command signal, a selectable one out of a plurality of head position signals as the servomechanism feedback signal and signal selection means for ascertaining which particular signal out of said plurality of head position indicating signals is usable by said servomechanism to position said head over said tracks with least error and operable to provide said command signal to said transducer to select said particular signal for exclusive use by said servomechanism in positioning said head adjacently to said tracks.

According to a preferred embodiment the tracks on a rotary disc all of which are data storage tracks save for one servo track, are equispaced, save for the omission of several tracks in the vicinity of the servo track. A head position transducer is provided in the form of an optical grating transmission device, and provides as output two triangular wave head position indicating signals nominally, but not necessarily precisely, in quadrature with one another, which signals provide input to a selector which is responsive to command signals from a controller to provide either of the input signals or either of their generated inverses as position feedback for the servomechanism. Preferably the servomechanism responds to external track commands from the controller to position the head at a selectable one of the zero crossing points of the selected position feedback signal representative of a plurality of selectable nominal head positions each of which corresponds to the head being interactive with but not necessarily centrally disposed over a selectable one out of the plurality of tracks. The signal selector comprises a servo track reader in receipt of signals received from the disc by the head and providing an output to the controller indicative, when the head is interactive with the servo track, of the sense of displacement of the head away from being centrally disposed thereover. The controller preferably provides the signal selection command to the selector, provides commands to bring the head over the servo track and provides a positive or negative positional demand signal to the servomechanism preferably via a binary number and a D/A convertor, in response to which the servomechanism moves the head to a selectable position away from the zero crossing points of the positional feedback waveform. The period of the positional feedback signals is equal to twice the track spacing. In use, the controller preferably commands the servomechanism to bring the head over the servo track, and thereafter varies the signal selection command to the transducer and after each selection, varies the demand signal to the servomechanism, responsively to the output of the reader to establish which of the four possible positional feedback signals available from the transducer brings the head into central disposition over the servo track with least magnitude of demand. Thereafter, the controller, preferably selects that signal of least demand, or its generated inverse, and applies the minimum demand it earlier found when positioning the head over the data storage tracks. The controller preferably performs its servo signal selection process at initial switching-on of the disc drive and thereafter at timed intervals.

The invention is further explained by way of an example, in the following description in conjunction with the appended drawings, in which:

BRIEF DESCRIPTION OF THE DRAWINGS

FIG. 2A shows the phase output waveforms derived from the positional transducer and FIG. 2B shows the quadrate waveform derived from the positional transducer.

FIG. 4 shows, in diagramatic form, the range of accessible positions available for each signal and its inverse.

FIG. 5 shows the relationships between the four position indicating signals with position.

DESCRIPTION OF THE PREFERRED EMBODIMENT

Figure 1:
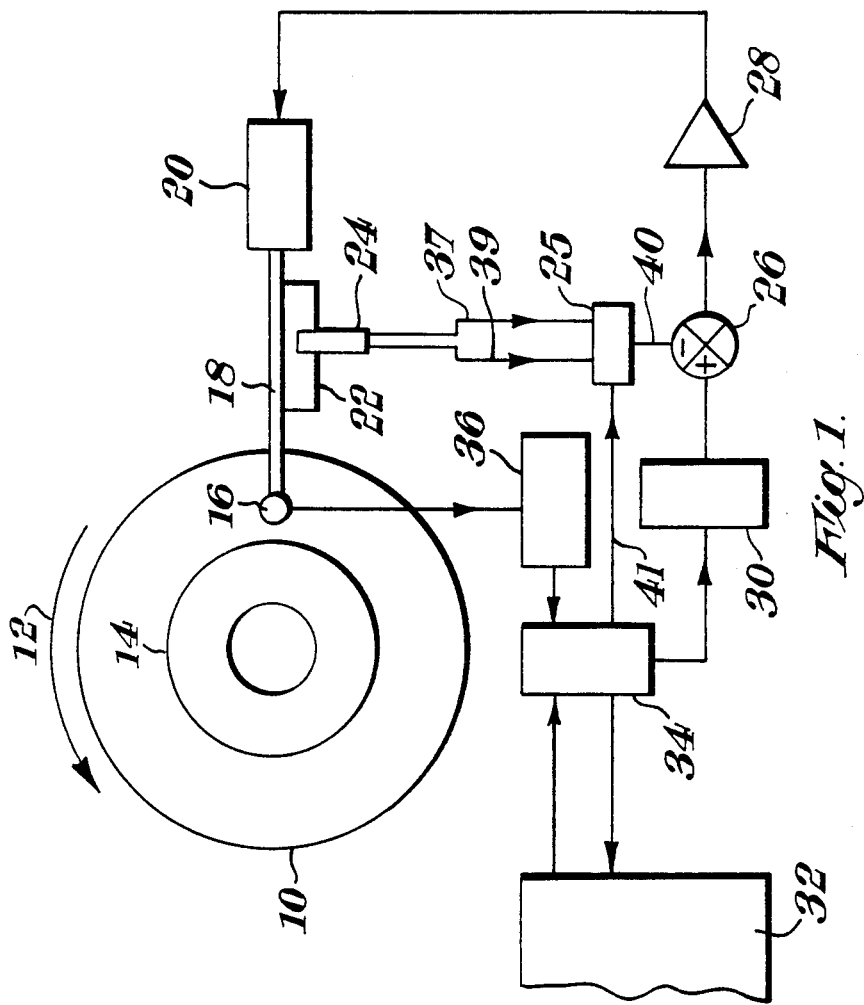
FIG. 1 shows, in schematic form, the system of the preferred embodiment.

FIG. 1 shows the head positioning and control system of a rotating disc magnetic data store.

A magnetic disc 10 has recorded thereon a plurality of concentric, circular, equispaced tracks. One of the tracks is a servo track 14, the rest are data storage tracks. The disc 10 rotates as indicated by the arrow 12. A magnetic read/write head 16 is disposed adjacently to the surface of the disc 10 and is radially positionable thereover to interact with any selectable one of the tracks. When the head 16 is over the servo track 14 it recovers signals therefrom which are provided as input to a servo track reader 36. The reader 36 provides output indicative of the sense of offset of the head 16 from being centrally disposed over the servo track 14.

The head 16 is positioned by a servomechanism comprising a mechanical coupling 18 joining the head 16 to a radial actuator 20, a two phase position transducer comprising a shutter 22 affixed to the coupling 18 and a static block 24 affixed within the disc drive, a signal selector and inverter 25, provided with the two position indicating output signals of the block 24 on the first and second transducer connections 37, 39 as input and operable to provide as output on the selector output connection 40 a selectable one out of its input signals or a selectable one of their generated inverses, a summing junction 26 receiving the output of the selector 25 from the selector output connection 40 as a substractive input, the output of a digital to analogue converter 34 as an additive, positional demand input, and providing as output the difference between its inputs, and a servo amplifier 28 having the output of the summing junction 26 as its input and driving the actuator 20.

The particular style of position transducer, an optical transmission grating device, is well known in the art and forms no part of the present invention.

A controller 34 receives the output of the reader 36 as input, is mutually responsive to an external host system 32 for the implementation of head positioning commands provides the signal selection input to the selector 25 and provides a positive or negative binary word input to the digital to analogue converter 30. The controller 34 responds to external commands from the host 32 to position the head 16 over selected tracks by manipulation of its outputs, and further is operable to set up the system of the present invention.

The head 16 is also used by the disc drive for the recording or recovery of data on the disc 10.

FIG. 2A and FIG. 2B show the two position indicating waveforms provided as the outputs of the positional transducer on the first and second transducer output connections 37, 39 respectively.

The two waveforms shown are nominally in a quadrature phase relationship to one another. In the practical case, the ninety degree phase difference is not exact.

These two waveforms, are provided as the controlled inputs to the selector 25.

Figure 3:
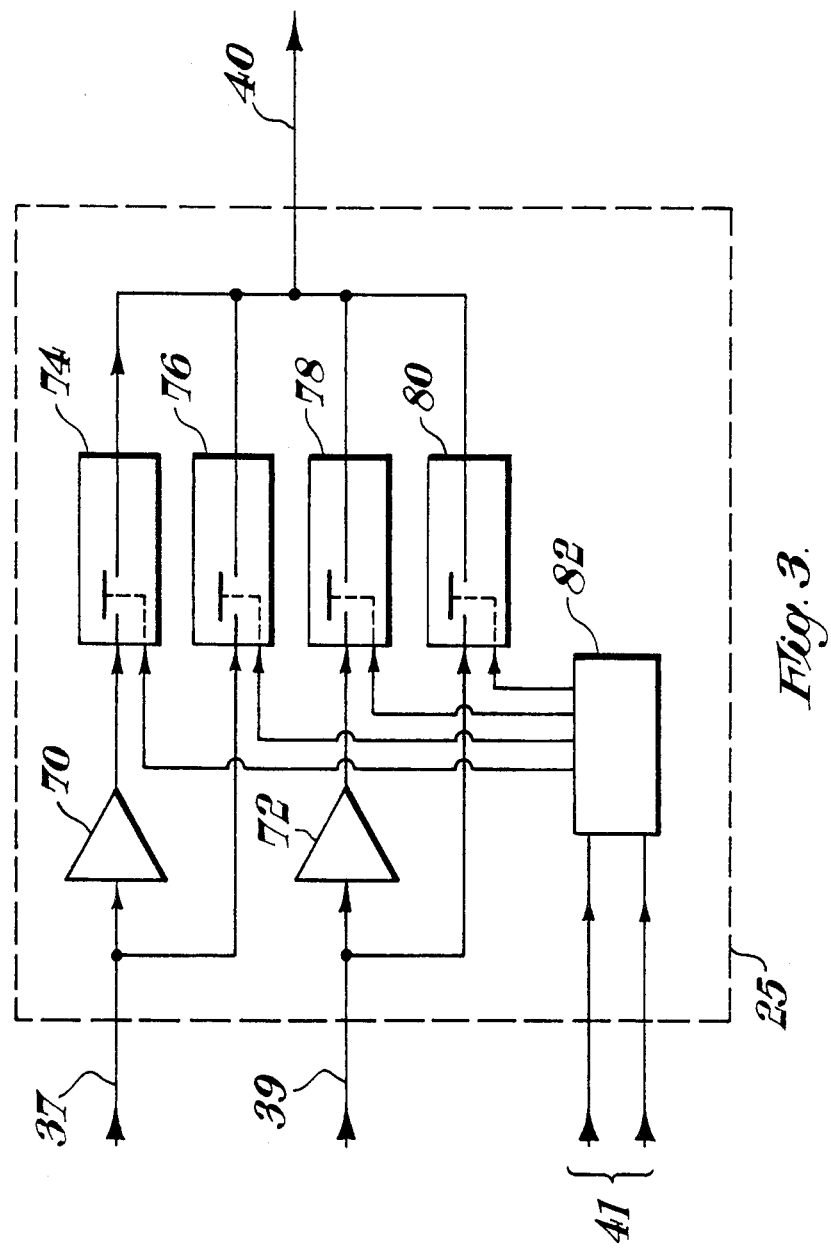
FIG. 3 shows details of the feedback signal selector.

FIG. 3 shows the selector 25.

The selector 25 is provided with the two position indicating signals from the positional transducer via the first and second transducer output connections 37, 39 and a command input from the controller 34 via a command connection 40. A first inverting amplifier 70, precisely inverts a first of the two signals and a second inverting amplifier 72, precisely inverts the second.

The amplifiers 70 and 72 by inverting these cyclic waveforms, equivalently shift their phases by 180°.

The two input signals and the two output signals of the amplifiers 70,72 are each uniquely and exclusively coupled as the signal input to one of four analogue gates 74, 76, 78, 80.

Each of the four analogue gates 74, 76, 78, 80 has a signal input as described and a control input from a 1 out of 4 decoder 82.

The decoder 82, is a logice device having as its input a two parallel binary digit selection command word from the controller 34, via the command connection 40, and having four outputs each uniquely coupled to one of the gate control inputs such that for each of the four different binary words which may be presented a different one of the four analogue gates 74, 76, 78, 80 is uniquely opened so as to provide its input signal as the output of the selector 25.

FIG. 4 shows the zones of stable rest positions available to the head positioning servo with respect to the output of the selector 25.

The signal shown is any of the four signals that the selector 25 may present as output.

Stable rest-points exist only on one slope of the signal. The sense of the amplifier 28 is such that the head 16 comes to rest, with zero output from the D/A 30, at the points X or Z. The inverse signal to that shown has the rest-point Y. The distance XY and the distance YZ are both equal to the distance between tracks on the disc 10.

Input from the D/A 30 causes the restpoint to be displaced, positive input moving it to the right and negative input moving it to the left. Restpoints may lie anywhere within the A zones. The servo is unstable in the B zones. The output magnitude of the D/A 30 is limited to prevent excursions from an A into a B zone.

FIG. 5 shows the relationship between the four signals available from the selector 25 and their associated bands of possible restpoints.

The signals are indicated by their phases, a first being arbitrarily designated as the 0° signal, shown in solid line, second lagging the first by ninety degrees, being designated the 90° signal, represented in broken line, third, the inverse of the first, being designated the 180° signal, represented by dotted line, and a fourth, the inverse of the second, being designated the 270° signal, represented by broken and dotted line. The bands of restpoints for each signal cover those portions of that signal which are rising to the right in the graphs.

The bands of restpoints for each signal overlap the bands of the two signals in a quadrature thereto, and are contiguous with the bands of its inverse signal.

The controller 34 is operable to move the head 16 to a selected band by applying a command sequence to the selector 25 wherein the selection of a signal is followed, after an interval to allow for execution of movement, by the selection of the signal in quadrature thereto in the desired direction. The servomechanism responds thereto by moving between stable positions in adjacent overlapping bands in a series of half track width steps terminating on the selected band.

Figure 6:
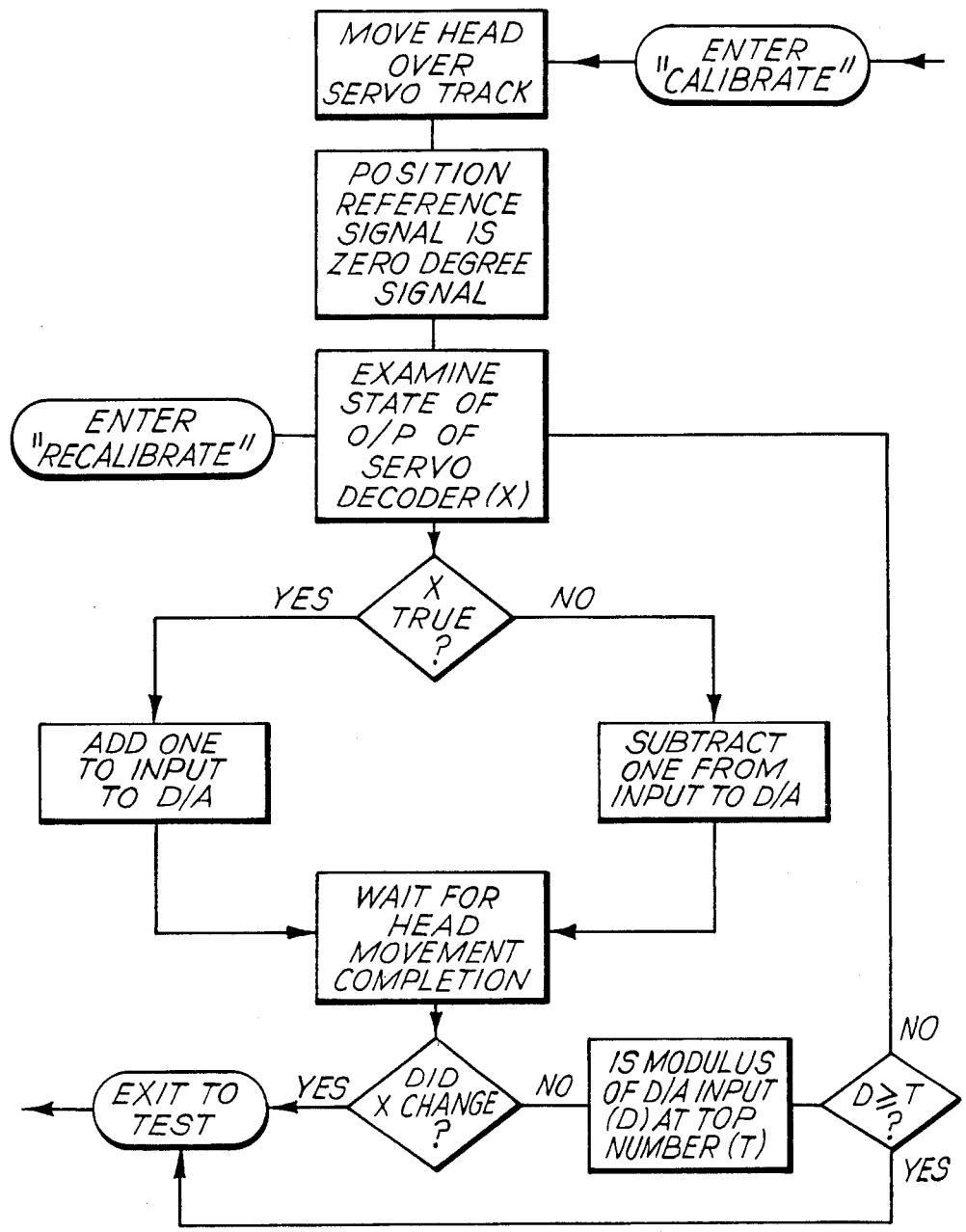
FIG. 6 shows, in a flow chart, the routine followed for centering the head over the servo track.

FIG. 6 shows the routine followed by the controller to reference all positions to the servo track. When power is first applied to the disc drive, and at timed intervals thereafter, chosen to be less than the time required for thermal changes to cause unacceptably large head positioning errors, the controller 34 executes an operational sequence for referencing all subsequent head positioning operations to the centre of the servo track 14, for selecting for head positioning use that signal from the transducer block 24 whose zero crossing points position the head 16 closest to the track centres, and for determining and applying the amount of demand required of that signal to bring the head 16 exactly over the track centres.

The servo track 14 is at least twice as wide as the largest anticipated radial positioning error. In the absence of error, it is arranged that the head 16 is centrally disposed thereover with the servomechanism at a predetermined zero crossing point of a predetermined one of the signals from the selector 25. The controller 34 moves the head to the predetermined zero crossing point. The width of the track 14 ensures that the head 26 is interactive with at least part thereof.

The controller applies demand responsively to the indication of the reader 26 to bring the head towards central disposition over the track.

The servo track 14 is used as a radial benchmark, which, being equispaced with the data storage tracks has the same radial displacement relative to a rest centre as they have. Knowing the position of the benchmark, in terms of the error in its position allows the controller 34 by assuming this same error to exist for every data storage track, to position the head 16 over any data storagetrack with precision.

The style of servo track, used in this preferred embodiment is a so-called "tribit" track, as taught by Meuller in U.S. Pat. No. 3,691,543 of Sept. 12, 1972, and the servo track decoder 36 is substantially the same decoder as described by Meuller with the exception that the present decoder has an output indicative only of the sense of the radial displacement of the head 16 from being central over the track 14 by replacing Meuller's output difference amplifier with a voltage comparator.

The controller 34 brings the head 16 over the servo track 14. This movement always terminates with the zero degree position indicating signal being presented at the output of the selector 25, since the nominal radius of the servo track is defined as being at the centre of a particular zero degree band of restpoints.

The controller 34 knows how many steps to admininster from the difference between its running tally and the predetermined step number of the servo track 14. The tally is started as the head 16 is loaded onto the disc, by an optical flag, mechanically coupled to the head 16, breaking a beam of light at a predetermined position nominated as the zero step. The breaking of the light beam is coupled, via a phototransistor, to the controller 34, which then begins an incremental count for every step towards the centre of the disc 10, and a decremental count for every step away from the centre of the disc 10.

The maximum radial distance separating the actual and nominal radii of the servo track 14 is a function of the construction of the disc drive.

The servo track 14 is recorded with a radial width equal to at least twice the maximum radial distance between the actual and nominal centres of the servo track 14 so that the head 16 is guaranteed to interact with at least some part of it.

Having thus placed the head 16 the controller 34 moves it into symetrical disposition over the servo track 14 by examining the output of the reader 36, applying responsively thereto a plurality of small, fixed, radial increments, by the repetetive and unidirectional incrementing or decrementing of the binary number, presented at the input of the D/A 30, waiting for a short period after each addition or subtraction before executing the next, to allow the head 16 to complete each movement, and stopping after that subtraction or addition where the indication of the decoder 36 changes. In this way, provided that the symetrically disposed position for the head 16 over the servo track 14 lies within the band of restpoints accessible to the zero degree signal the head 16 is brought to the centrally disposed position over a servo track 14.

Figure 7:
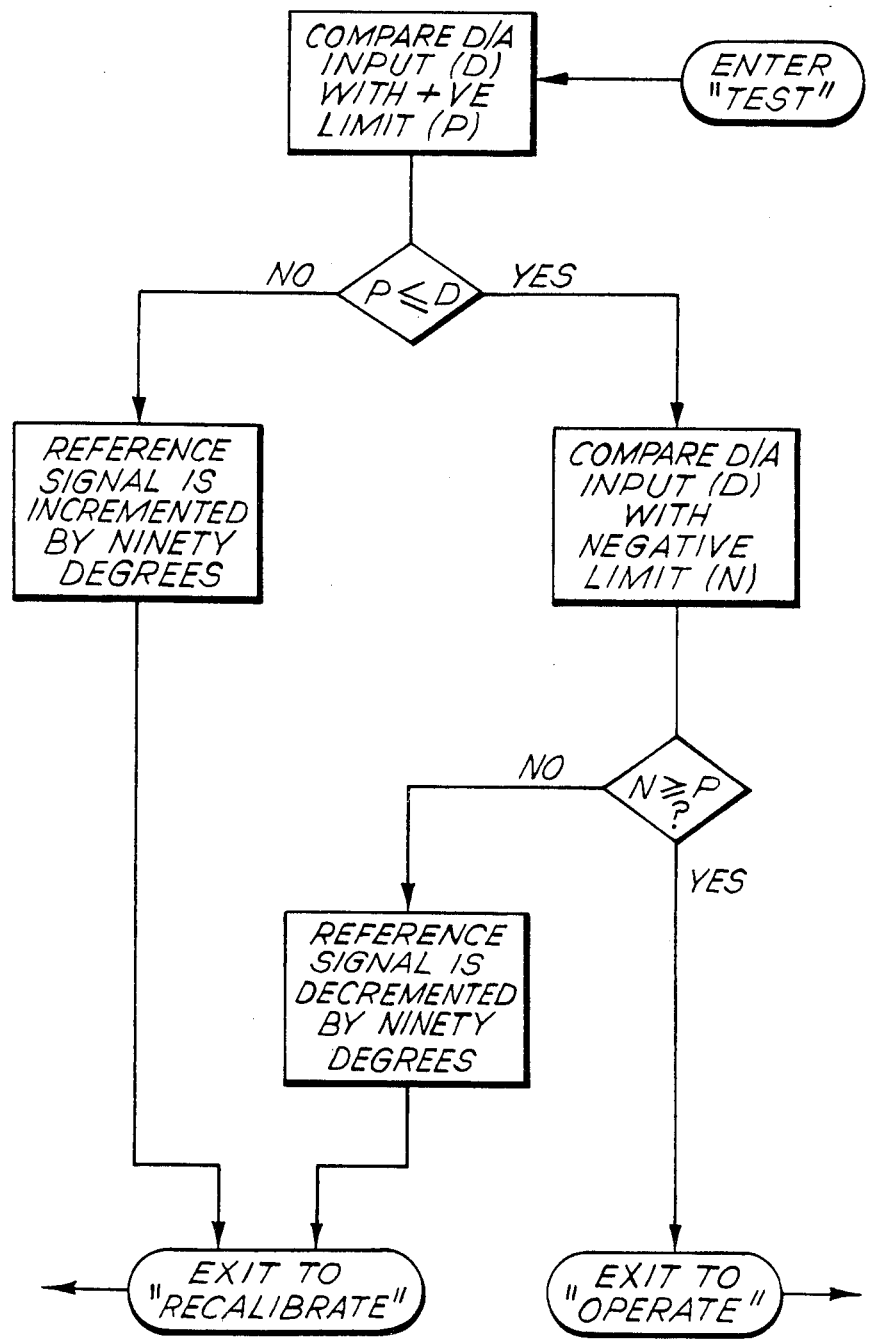
FIG. 7 shows the routine followed in deciding which of the four position indicating signals is suitable for use.

If the centrally disposed position is not accessible to the zero degree signal as indicated by the input to the D/A 30 having reached its greatest magnitude without change in the output of the reader 36 then exit is made to the test routine of FIG. 7.

FIG. 7 shows the routine followed by the controller 34 in order to test the acceptability of the radial offset found for the actual position of the centre of the servo track 14.

This routine, the "test" routine, is entered whenever the controller 34 believes it has found the centre of the servo track 14, or has exceeded the top number on the input to the D/A 30.

The object of the "test" routine is firstly, to ascertain whether or not the number last provided at the input of the selector 25 is acceptably low, and secondly, if the number is too high, to change the signal presented at the output of the multiplexer 25 in the appropriate direction and to recentre the head 16 over the servo track 14 via the "recalibrate" entry point to the "calibrate" routine.

The number D, last supplied by the controller 34 to the input of the D/A 30 during the "calibrate" routine, is firstly compared with a positive upper limit number P. If the number D exceeds the positive upper limit P, then the offset to bring the head 16 to be centrally disposed over the servo track 14 is too large, and the signal, provided at the output of the selector 25 is abandoned in favour of the ninety degree incremented signal. Thus the zero degree signal is abandoned in favour of the ninety degree signal, the ninety degree signal is abandoned in favour of the one hundred and eighty degree signal, the one hundred and eighty degree signal is abandoned in favour of the two hundred and seventy degree signal, and the two hundred and seventy degree signal is abandoned in favour of the zero degree signal.

If the number D, last supplied to the input of the D/A does not exceed the positive upper limit P, then it is further compared with a negative upper limit N. If the number D is more negative than the negative upper limit N, indicating that the offset to bring the head 16 to the centrally disposed position over the servo track 14 is too large, then the signal, switched through to the output of the multiplexer 25 is abandoned in favour of that signal decremented by ninety degrees. Thus, the zero degree signal is abandoned in favour of the two hundred and seventy degree signal, the ninety degree signal is abandoned in favour of the zero degree signal, the one hundred and eighty degree signal is abandoned in favour of the ninety degree signal, and the two hundred and seventy degree signal is abandoned in favour of the one hundred and eighty degree signal.

If the number D has fallen outside of either of the limits N and P, and the signal at the output of the multiplexer has thus had to be changed, then the "test" routine terminates by a transfer to the "recalibrate" entry to the "calibrate" routine, where the controller 34 once again attempts to place the head 16 into the centrally disposed position over the servo track 14. If the controller 34 enters the "test" routine because of having supplied the top positive or negative number to the input of the D/A 30 during the calibrate routine, then one or other of these tests will automatically have been failed. If the number D has passed all tests, and the size of the offset is thus deemed acceptable, then the "test" routine exists to normal disc file operations. The upper limit P and the lower limit N are set such that the signal finally accepted, is that signal providing least deviation from its central restpoint. It is to be appreciated that a routine actually measuring the deviation for each of the signals and selecting that signal with least deviation is also within the spirit of the present invention.

The controller 34, uses the "calibrate" and "test" routines together, to move the head 16 radially across the surface of the disc 10 until the head 16 lies symmetrically disposed over the servo track 14. If the controller 34 cannot bring the head 16 to this position with the zero degree position indicating signal provided as the output of the selector 25, then one or other of the quadrate signals is next provided as the multiplexer's 25 output. If the controller 34 still cannot bring the head 16 to be symmetrically disposed over the servo track 14 the controller 34 continues to change the signal, provided as the output of the selector 25, until one of the signals is found where the head 16 may be so disposed with an acceptably small binary number provided as the input to the D/A 30.

The act of changing the signal, presented as the output of the selector 25, causes the head 16 be stepped unidirectionally across the surface of the disc 10 towards the centre of the servo track 14. The acceptance of that signal with least deviation from its central restpoint minimises positional inaccurracies resulting from unequal amplitudes between any one position indicating signal and its inverse and prevents overshoot from the ringing of an optimally damped servomechanism carrying over into an unstable band.

The limit placed on the excursion from the centre of a band of restpoints must not exclude the possibility of placing the head 16 over any possible data-track radius on the disc 10. The binary number applied to the D/A 30 must be able to move the head 16 a minimum distance away from the centre of a band of restpoints equal to the sum of one quarter the width of a band of restpoints plus the maximum phase error between any position indicating signal and its quadrates, expressed as a linear distance.

When positioning the head 16 over data storage tracks the controller 34 applies the deviation found for the accepted signal as a correction, via the D/A 30, to the summing junction 26.

Figure 8:
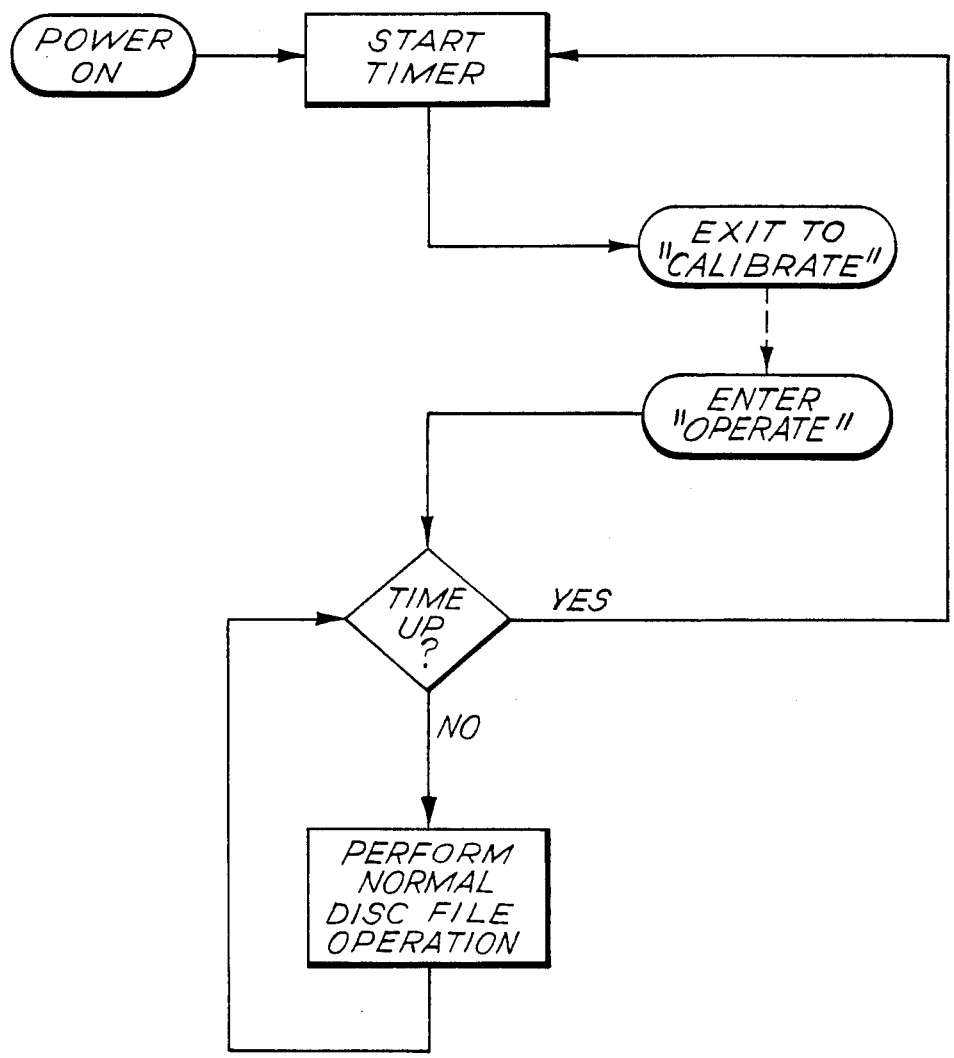
FIG. 8 shows the routine which determines when a servo calibration is required.

FIG. 8 shows the routine followed by the controller 34 during the course of the general functioning of the disc drive.

This routine is followed by the controller 34 at all times. Whenever power is first applied to the disc file, the controller 34 starts a five minute timer and sends the head 16 to the centre of the servo track 14, storing the value of the binary number last applied to the input to the D/A 30 as the head 16 became centered over the servo track 14, and also storing the identity of the particular position indicating signal provided as the output of the multiplexer 25 at that time. Thereafter, the controller 34 responds to operational commands from the host 32, attending to data deposition and retreival requests. In addition, the controller 34 restarts the five minute timer and recentres the head 16 over the servo track 14 whenever the timer indicates the elapse of five minutes since this was last done.

The centering of the head 16 over the servo track 14 every five minutes minimises the head 16 mispositioning effect of long and short term temperature drifts. In particular, the rapid environmental temperature changes, and the attendant dimensional changes resulting from switch on from a cold start, are reduced to manageable proportions by the position of the head 16 being corrected before changes become large enough to cause a data transfer error. The five minute period reflects the minimum time in which unacceptable dimensional changes may take place. This period may of course be different for different forms of construction. The period may also be made an increasing function of time after switch-on thus giving frequent correction during the rapid warm-up phase and less frequent correction as thermal conditions become more stable.

The normal operations of the disc file involves the controller 34, in response to operational instructions from the host system 32, instructing the positioning system to send the head 16, into adjacent disposition with data storage tracks on the disc 10, for the purpose of data deposition or data retreival.

Attention is briefly redrawn to FIGS. 6 and 7. The reference signal referred to therein, that is, the particular one of the four position indicating signals which is presented as the output of the multiplexer 25, is that signal whose indentity if stored by the controller 34 when the head 16 is at last brought into symmetrical disposition over the servo track 14. This final reference signal is then employed, together with its inverse, for the positioning the head 16 over all data storage tracks.

The data storage tracks are divided into two groups. A first group is accessed by the head 16 when the reference signal is provided as the output of the multiplexer 25. A second group is accessed by the head 16 when the inverse to the reference signal is provided as the output of the multiplexer 25. The members of the first group alternate with the members of the second group radially across the surface of the disc 10, so that, starting on a member of the first group, every other track is a member of that first group, and starting on a member of the second group, every other track is similarly a member of that second group.

In placing the head 16 over a specific data storage track, the controller 34 firstly receives an instruction from the host 32 to send the head 16 to a specifically numbered track location. The track locations are sequentially numbered, by unit increment, from the rim to the centre of the disc 10, with the track of greatest radius having the number zero. Certain track numbers are never asked for by the host, these being the locations of the servo track 14. The controller 34 ascertains from the oddness or eveness of the track number whether it belongs to the first or second group. The controller 34 then, by varying the two bit binary word presented as the command input to the selector 25, in the appropriate sequence, steps the head 16 across the surface of the disc 10, stopping at the appropriate step number in its running tally, with either the reference signal or its inverse appropriately provided as the output of the multiplexer 25. The controller 34 then applies to the input of the D/A 30 that binary number D which it used to bring the head 16 into the centrally disposed position over the servo track 14.

It is to be appreciated that more than one servo track may be provided at different radii on the surface of the disc, each servo track independently or by interpolation providing positional correction information.

It is also to be appreciated that the above techniques may equally well be applied to the signals from any poly-phase, cyclically repetitive position indicating transducer.

It will further be apparent that the particular style of servo track, utilised in the preferred embodiment, may be replaced by any style of servo track which may be intercepted and decoded using a normal reading head.

It will finally be apparent that the recording method, described in the preferred embodiment as being magnetic, may equally well be replaced by any other recording method capable of use with a rotating disc.

We claim:

1. A feedback servomechanism for positioning a head adjacently to a selectable one out of a plurality of concentric, circular, data storage tracks on a rotary disc in a disc data store, said servomechanism comprising;
   a head position transducer coupled to said head and providing, as output, a plurality of signals indicative of the radius of interaction of said head on a disc,
   a feedback signal selector for providing, in response to a selection signal, a selectable one out of said plurality of output signals from said transducer as the feedback signal for said servomechanism, and,
   a controller for examining the accuracy with which said head is positioned relatively to said tracks when each of said plurality of output signals from said transducer is provided as the feedback signal to said servomechanism and for providing said selection signal to said selector to select that one out of said plurality of transducer output signals which positions said head relatively to said tracks with least error, whenever it is required that said head be so positioned.

2. A servomechanism according to claim 1 for use with a disc whereon said data tracks are located on a regularly spaced radial array of positions and whereon there is a servo track also located on said array, wherein said plurality of signals from said transducer are each cyclically repetetive signals suitable for positioning said head at a plurality of regularly-spaced radii on the disc, having the same spacing as said positions in said array, and wherein said controller comprises;
   a servo track reader for decoding signals recovered by said head from a servo track and for providing indication of the displacement of said head from being centrally disposed thereover,
   test means for providing said selection signal to said selection means to select each of said plurality of transducer signals in turn as the feedback signal for said servomechanism,
   displacement recording means resposive to the output of said reader to record the displacement of said head from being centrally disposed over a servo track when each of said plurality of transducer output signals is provided as the feedback signal to said servomechanism, and
   decision means responsive to said recording means to supply to said selection means that selection signal which selects that one out of said plurality of transducer output signals having the least displacement, whenever said head is required to be positioned over a data storage track.

3. A servomechanism according to claim 2 wherein said displacement recording means comprises;
   a demand signal generator for providing, in response to said indication by said reader, a demand signal to said servomechanism to move said head to be centrally disposed over the servo track,
   and wherein the level of said demand signal so applied to said servomechanism when said reader provides indication of said head being centrally disposed over the servo track is recorded as said displacement.

4. A servomechanism according to claim 3 wherein said demand signal generator comprises;
   a binary number generator, and
   a digital-to-analog convertor,
   said binary number convertor generating a digital representation of a binary number in response to the indication of said reader, and
   said representation of said binary number being coupled as an input to said digital-to-analog convertor, and
   said output of said convertor being coupled as said demand signal to said servomechanism,
   said recording means comprising;
   a memory for storing said digital representation of said binary number when said reader indicates that said head is centrally disposed over the servo track.

5. A servomechanism according to claim 4 wherein said selector comprises a plurality of analog gates, there being one gate for each of said plurality of position indicating signals, any one of said plurality of gates being operable in response to said selection signal to couple its particular one of said plurality of position signals from said transducer as the feedback signal to said servomechanism.

6. A servomechanism according to claim 5 wherein said transducer comprises;
   a lightsource,
   a photosensor,
   a static optical shutter, and
   a movable optical shutter,
   said movable shutter being mechanically coupled to move with said head,
   said lightsource providing a beam of light passing through both said static shutter and said movable shutter, and
   said photosensor detecting said beam of light subsequently to its passage through said shutters and providing, in response to the modulation of said beam of light by said shutters, said plurality of position indicating signals.

7. A servomechanism according to claim 6 wherein each of said plurality of said position indicating signals is regularly repetitive with the radius of interaction of said head on a disc with a period equal to the distance between the data storage tracks.

8. A servomechanism according to claim 6 wherein each of said plurality of said position indicating signals is regularly repetetive with the radius of interaction of said head on a disc with a period equal to twice the distance between data storage tracks, and
   wherein said selection means is operable, in response to said selection signal, to provide as the feedback signal to said servomechanism, either a selected one of said plurality of signals from said transducer, or the generated inverse thereof.

9. A servomechanism according to claim 7 or to claim 8 wherein said servo track reader is a tribit reader, for use with a disc whereon said servo track is a tribit track.

* * * * *